United States Patent
Thoshkahna

(10) Patent No.: US 12,380,893 B1
(45) Date of Patent: Aug. 5, 2025

(54) ENHANCED CONTENT MATCHING USING CONTENT FINGERPRINTS

(71) Applicant: Amazon Technologies, Inc., Seattle, WA (US)

(72) Inventor: Balaji Nagendran Thoshkahna, Kangalore (IN)

(73) Assignee: Amazon Technologies, Inc., Seattle, WA (US)

(*) Notice: Subject to any disclaimer, the term of this patent is extended or adjusted under 35 U.S.C. 154(b) by 306 days.

(21) Appl. No.: 17/456,201

(22) Filed: Nov. 23, 2021

(51) Int. Cl.
*G10L 17/06* (2013.01)
*G10L 21/0324* (2013.01)
*G10L 21/10* (2013.01)

(52) U.S. Cl.
CPC .......... *G10L 17/06* (2013.01); *G10L 21/0324* (2013.01); *G10L 21/10* (2013.01)

(58) Field of Classification Search
CPC ...... G10L 17/06; G10L 21/0324; G10L 21/10
See application file for complete search history.

(56) References Cited

U.S. PATENT DOCUMENTS

| 10,236,006 | B1* | 3/2019 | Gurijala | G10L 19/02 |
| 2009/0129521 | A1* | 5/2009 | Core | H03M 7/30 |
| | | | | 341/126 |
| 2011/0173185 | A1* | 7/2011 | Vogel | G06F 16/634 |
| | | | | 707/E17.014 |
| 2013/0085762 | A1* | 4/2013 | Mano | G10L 19/265 |
| | | | | 704/500 |
| 2013/0326573 | A1* | 12/2013 | Sharon | G06F 16/783 |
| | | | | 725/115 |
| 2023/0116909 | A1* | 4/2023 | Völcker | H04L 9/3236 |
| | | | | 705/51 |

OTHER PUBLICATIONS

Kim, Hyoung-Gook, and Jin Young Kim. "Robust audio fingerprinting method using prominent peak pair based on modulated complex lapped transform." ETRI Journal 36, No. 6 (2014): 999-1007. (Year: 2014).*

Palaz, Okan, H. Fatih Ugurdag, Ozgur Ozkurt, Bugra Kertmen, and Faruk Donmez. "RlmCom: raster-order image compressor for embedded video applications." Journal of Signal Processing Systems 88 (2017): 149-165. (Year: 2017).*

* cited by examiner

*Primary Examiner* — Daniel C Washburn
*Assistant Examiner* — Paul J. Mueller
(74) *Attorney, Agent, or Firm* — Eversheds Sutherland (US) LLP

(57) ABSTRACT

Devices, systems, and methods are provided for using fingerprints of signals to match content. A method may include receiving, by a device, a first signal; generating a first value indicative of a first peak of a spectrogram for the first signal; generating a second value indicative of a second peak of the spectrogram; generating a third value indicative of a difference between a first time of the first peak and a second time of the second peak; generating a first quantized value based on the first value; generating a second quantized based on the second value; generating a first fingerprint based on the first quantized value, the second quantized value, and the third value; determining, based on a comparison of the first fingerprint to a second fingerprint, a match between the first fingerprint and the second fingerprint; and sending an indication of the match.

20 Claims, 12 Drawing Sheets

ENHANCED CONTENT MATCHING USING CONTENT FINGERPRINTS

BACKGROUND

Computer systems increasingly are being used to analyze and verify data. When analyzing a large corpus of data, a slight variation in content may result in a significant impact in accurately identifying matching content. For example, analysis of an audio signal to identify a matching audio signal may be undermined by an offset in the sampling of the audio signal.

Figure 1:
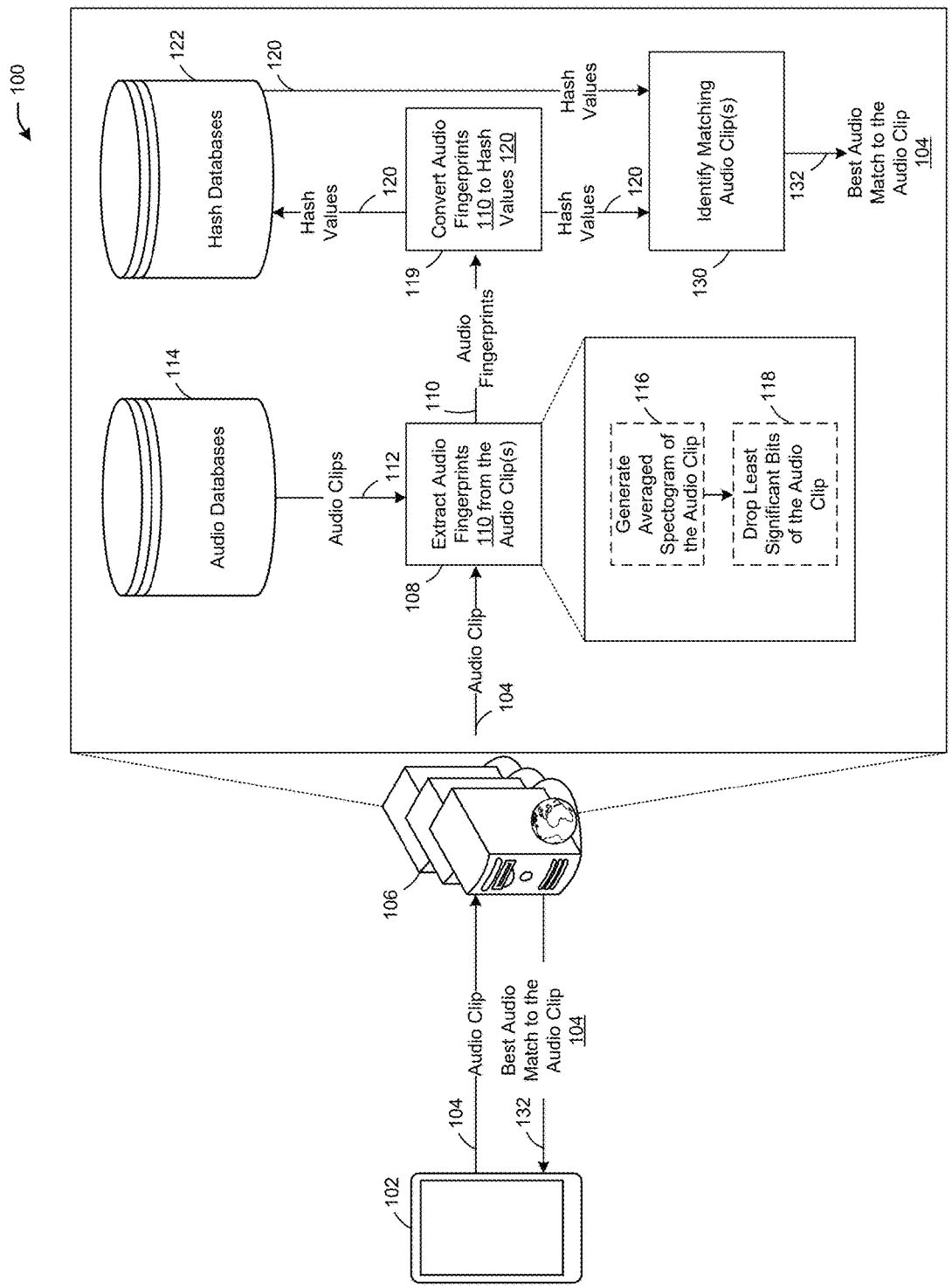
FIG. 1 illustrates an example process for enhanced content matching using content fingerprints, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for content matching using content fingerprints.

Audio and other data may be compared to similar data to identify matching data. For example, an audio clip of a song may be compared to other audio clips to identify a matching song. Some techniques for such analysis may include splitting an audio signal into frames, shifting the frames, applying a transform (e.g., a short-time Fourier transform), generating a spectrum based on the transform, identifying peaks in the spectrum, and generating a "fingerprint" that includes the peaks and a time distance (e.g., difference) between the peaks. Computer systems may compare fingerprints to one another to identify matching fingerprints. For example, matching fingerprints may be an indication that the audio used to generate the fingerprints is audio of a same song, by a same artist, etc. For example, peaks may be selected when a time-frequency point has more energy than its neighboring time-frequency points centered around the peak.

The comparison of data such as audio clips using fingerprints is useful in various situations, such as to avoid inaccurate data to be presented. For example, an audio clip whose metadata indicates that it represents an audio track (e.g., a song) by a particular artist may not be the indicated song by the indicated artist. In this manner, the use of fingerprints to identify matching data may be used to avoid incorrect data offerings (e.g., audio listed as a known song by a known artist when the audio does not include that song), which may avoid copyright issues and the like. Computer systems that present content (e.g., audio titles, video titles, etc.) that are selectable to users (e.g., to stream, download, etc.) may benefit from detecting and preventing inaccurate content listings by using fingerprint comparisons to identify duplicates and/or false entries.

Some techniques for generating fingerprints to use in a comparison may be susceptible to inaccuracies. For example, some techniques may be undermined by an offset in the sample of content (e.g., a sampling grid used to split an audio signal into frames). When a signal is offset by a half a frame, for example, local peaks in the corresponding spectrum may be different than the peaks in the spectrum of the un-shifted signal. Because of the shifts in the peaks, the many fingerprints that may be generated may be impacted, as the fingerprints may include data indicating the peaks (e.g., spectrum magnitude) and their occurrence in time. This may pose an issue. For example, when signals X and Y are the same, but signal Y has an additional half frame (e.g., 256 samples) worth of silence at its beginning, the sampling grids for signals X and Y are different, so the corresponding fingerprints for signals X and Y are different. Therefore, when comparing the fingerprints of signals X and Y to identify a match, the match may not be identified. The problem may be exacerbated, for example, when one clip is 30 seconds from signal X, but the clip begins in the middle of the sampling grid. In this situation, the extracted fingerprints may be different, leading to reduced matching rates with signal Y even though signal X and signal Y may represent the same audio content (e.g., song).

To account for these problems, some techniques generate many fingerprints by oversampling the signals under the premise that a significant percentage of the fingerprints will survive random sampling to identify matching fingerprints. However, one drawback of this solution is that the large number of fingerprints may result in fingerprint "collision," and therefore may result in more mismatches (e.g., fingerprints improperly identified as matching) when there are larger data sets of fingerprints to analyze.

There is therefore a need for enhanced generation of content fingerprints to use in content matching.

In one or more embodiments, a computer system may generate a fingerprint representative of a signal (e.g., an audio signal). For example, a signal's spectrogram may represent changes in magnitude (e.g., frequency) of the signal over time. The computer system may divide the signal into equal portions (e.g., bins). Based on the spectrum magnitude of a signal at the different bins, the computer system may identify peaks (e.g., highest points in signal magnitude) and the corresponding time bins at which the peaks occur. The computer system may generate fingerprints for a signal, the fingerprints including a pair of peaks and a time distance between the pair of peaks (e.g., peak1, peak2, $time_{peak2}$-$time_{peak1}$). The computer system may store the fingerprints in a hash table to be compared to other fingerprints (e.g., as part of a matching process to identify matching signals).

In one or more embodiments, the computer system may quantize the positions of the identified peaks for a fingerprint. For example, using a 512-bin spectrum, peak1 and peak2 each would require nine bits to represent. However, peak2 may be represented as a differential with respect to peak1. Similarly, the time difference between peak1 and peak2 may be referred to in terms of the number of frames (td), and the computer system may select a reduced number of bits (e.g., six bits) to represent the time difference, resulting in a total of 24 bits to represent the fingerprint. In particular, the computer system may shift peak1 by six bits (e.g., 9+6=15 bits), peak2 by six bits, and not shift td. In this manner, the fingerprint may be generated using a bitOR function (e.g., Fingerprint=F1 bitOR F2 bitOR F3, where F1=shifted peak1, F2=shifted peak2, and F3=td). Prior to the shifting of the peaks, the computer system may quantize the peaks (e.g., by dropping a least significant bit or two and making the bit or two bits a zero value). For example, if peak1 has a value of 35 (binary 100011), single-bit quantization may result in a value of 34 (binary 100010), and two-bit quantization may result in a value of 32 (binary 100000). Both peaks of a fingerprint may be quantized by one or two bits each, or independently. As a result, the hashing of the quantized fingerprints may be more robust, and more matching fingerprints may be found when searching for a fingerprint that matches a query signal.

In one or more embodiments, the computer system may use an averaged spectrogram to generate fingerprints. From any original signal, the computer system may generate two signals: one that is left-shifted (e.g., by half a frame), and one that is right-shifted (e.g., by half a frame). The computer system may determine magnitude spectrograms for the three signals as $X_{original}$, $X_{left}$, and $X_{right}$. The computer system may generate an average spectrum $X_{avg}$ by determining the mean of the three magnitude spectrograms: $X_{avg}[i,j]$=$X[i,j]$+$X_{left}[i,j]$+$X_{right}[i,j]$, where i is the frame number, and j is the bin number. As a result, the fingerprints generated using the average spectrogram may improve the positive matching rates of signals.

In one or more embodiments, the enhancements described herein may provide an increased signal matching accuracy, especially when using higher signal bitrates. In particular, the enhancements described herein provide improvements in signal matching in additive white Gaussian noise and codec artifact noise when compared to some existing techniques.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example process 100 for enhanced content matching using content fingerprints, in accordance with one or more example embodiments of the present disclosure.

Referring to FIG. 1, the process 100 may include a device 102 sending an audio clip 104 (e.g., a portion of a song) to a remote device 106 (e.g., a cloud-based server) to identify a matching audio clip. For example, the device 102 may send the audio clip 104 to the remote device 106 as a query to determine a song represented by the audio clip 104. The remote device 106 may, at step 108, extract audio fingerprints 110 from the audio clip 104 and from other audio clips 112 stored by audio databases 114. The remote device 106 may extract the audio fingerprints 110 by using one or more techniques, such as generating an averaged spectrogram of an audio clip at step 116, and/or dropping least significant bits of the audio clip at step 118, as explained further below. The remote device 106 may, at step 119, convert the extracted audio fingerprints 110 to hash values 120 (e.g., using a hashing technique). The hash values 120 may be stored in hash databases 122 for future use (e.g., to evaluate for matches with other audio clips received as queries), and the remote device 106 may, at step 130, identify one or more audio clips from the hash values 120 that best match the audio clip 104 (e.g., best match the fingerprint of the audio clip 104). A best audio clip match 132 to the audio clip 104 may be returned to the device 102 as a result of providing the audio clip 104. For example, the audio clip 104 and the best audio clip match 132 may match by having the same or similar fingerprints, representing that the audio clip 104 and the best audio clip match 132 are from a same audio track (e.g., a same song).

In one or more embodiments, the remote device 106 may generate a fingerprint representative of a signal (e.g., an audio signal represented by the audio clip 104). For example, a signal's spectrogram may represent changes in magnitude (e.g., frequency) of the signal over time. The remote device 106 may divide the signal into equal portions (e.g., bins). Based on the spectrum magnitude of a signal at the different bins, the remote device 106 may identify peaks (e.g., highest points in signal magnitude) and the corresponding time bins at which the peaks occur. The remote device 106 may generate the audio fingerprints 110 for a signal, the audio fingerprints 110 including a pair of peaks and a time distance between the pair of peaks (e.g., peak1, peak2, $time_{peak2}$-$time_{peak1}$). The remote device 106 may store the audio fingerprints 110 in a hash table (e.g., the hash databases 122) to be compared to other fingerprints (e.g., as part of a matching process to identify matching signals).

In one or more embodiments, the remote device 106 may quantize the positions of the identified peaks of the signal represented by the audio clip 104 to generate a fingerprint. Similarly, the time difference between peak1 and peak2 may be referred to in terms of the number of frames (td), and the remote device 106 may select a reduced number of bits to represent the time difference. In particular, the remote device 106 may shift peak1 by six bits (e.g., 9+6=15 bits), peak2 by six bits, and not shift td. In this manner, the fingerprint may be generated using a bitOR function (e.g., Fingerprint=F1 bitOR F2 bitOR F3, where F1=shifted peak1, F2=shifted peak2, and F3=td). Prior to the shifting of the peaks, the remote device 106 may quantize the peaks (e.g., by dropping a least significant bit or two and making the bit or two bits a zero value) at step 118. For example, if peak1 has a value of 35 (binary 100011), single-bit quantization may result in a value of 34 (binary 100010), and two-bit quantization may result in a value of 32 (binary 100000). Both peaks of a fingerprint may be quantized by one or two bits each, or independently. As a result, the hashing of the quantized fingerprints may be more robust, and more matching fingerprints may be found when searching for a fingerprint that matches a query signal (e.g., the signal represented by the audio clip 104).

In one or more embodiments, the remote device 106 at step 116 may use an averaged spectrogram to generate fingerprints. From any original signal, the remote device 106 may generate two signals: one that is left-shifted (e.g., by half a frame), and one that is right-shifted (e.g., by half a frame). The remote device 106 may determine magnitude spectrograms for the three signals as $X_{original}$, $X_{left}$, and $X_{right}$. The computer system may generate an average spectrum $X_{avg}$ by determining the mean of the three magnitude spectrograms: $X_{avg}[i,j]=X[i,j]+X_{left}[i,j]+X_{right}[i,j]$, where i is the frame number, and j is the bin number. As a result, the fingerprints generated using the average spectrogram may improve the positive matching rates of signals.

In one or more embodiments, the device 102 and/or the remote device 106 may include a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a Blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

Figure 2A:
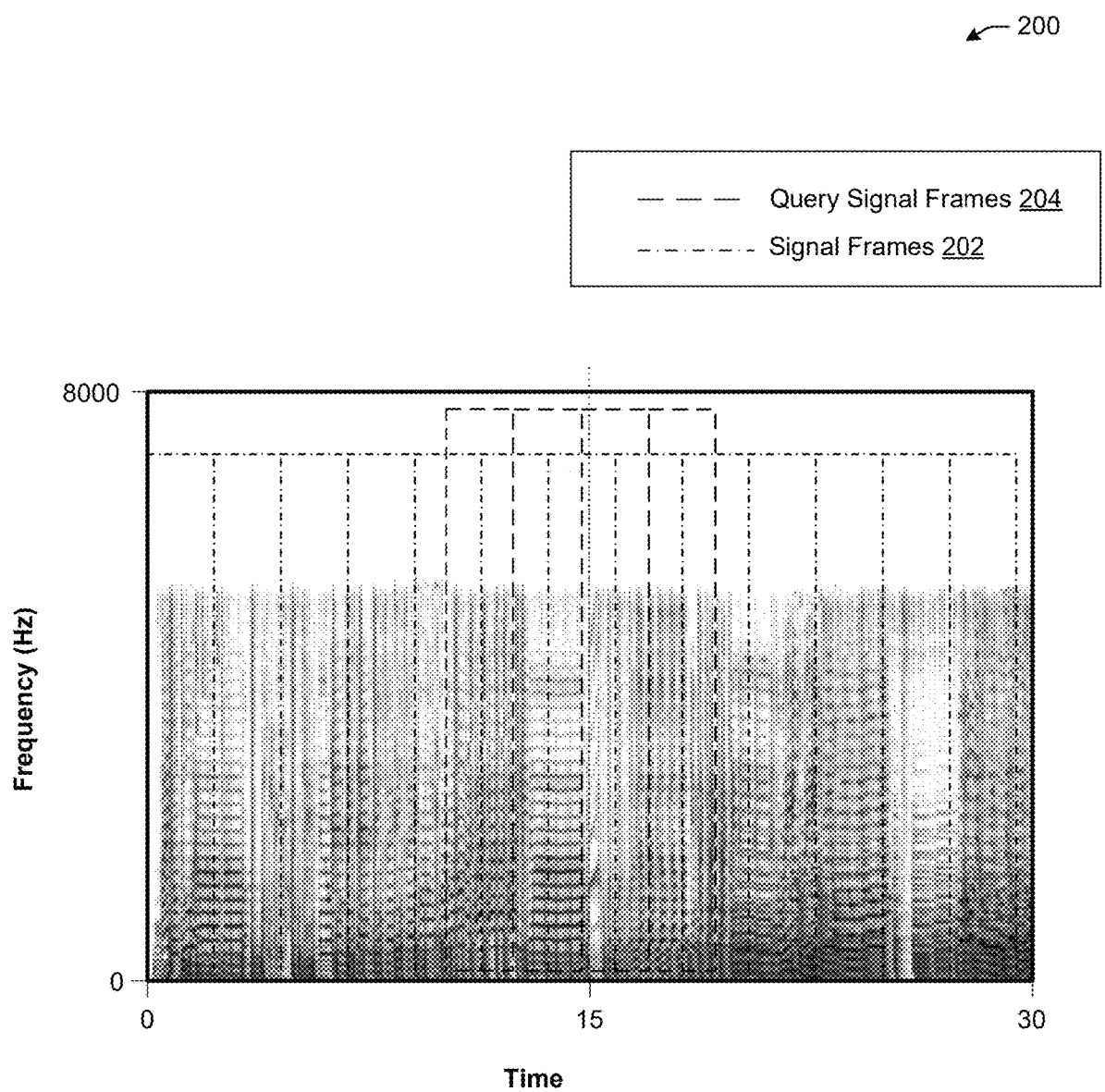
FIG. 2A shows exemplary frames of an audio signal used for enhanced content matching using content fingerprints, in accordance with one or more example embodiments of the present disclosure.

FIG. 2A illustrates exemplary frames of an audio signal 200 used for enhanced content matching using content fingerprints, in accordance with one or more example embodiments of the present disclosure.

Referring to FIG. 2A, the audio signal 200 may represent an audio track, such as the audio clip 104 of FIG. 1. To generate audio fingerprints, such as the audio fingerprints 110 of FIG. 1, the audio signal 200 may be divided into frames 202 of equal size in time (e.g., win_len of 512 samples or some other number), and shifting the frames 202 by a shift length (e.g., win_shift of 256 samples or some other number). In the example shown in FIG. 2A, the size of the frames 202 may equal the shift length (e.g., win_len=win_shift), although that is just an example and not intended to be limiting. The audio signal 200 may represent frames 204 of the query signal to be analyzed for a matching fingerprint (e.g., the frames 204 may represent the frames of the audio clip 104, whereas the frames 202 may represent a broader portion of an audio track of which the audio clip 104 is a part). In this manner, a fingerprint of the frames 204 may be compared to other fingerprints, such as fingerprints generated by the frames 202, to determine whether the frames 202 and the frames 204 are from a matching audio track.

Figure 2B:
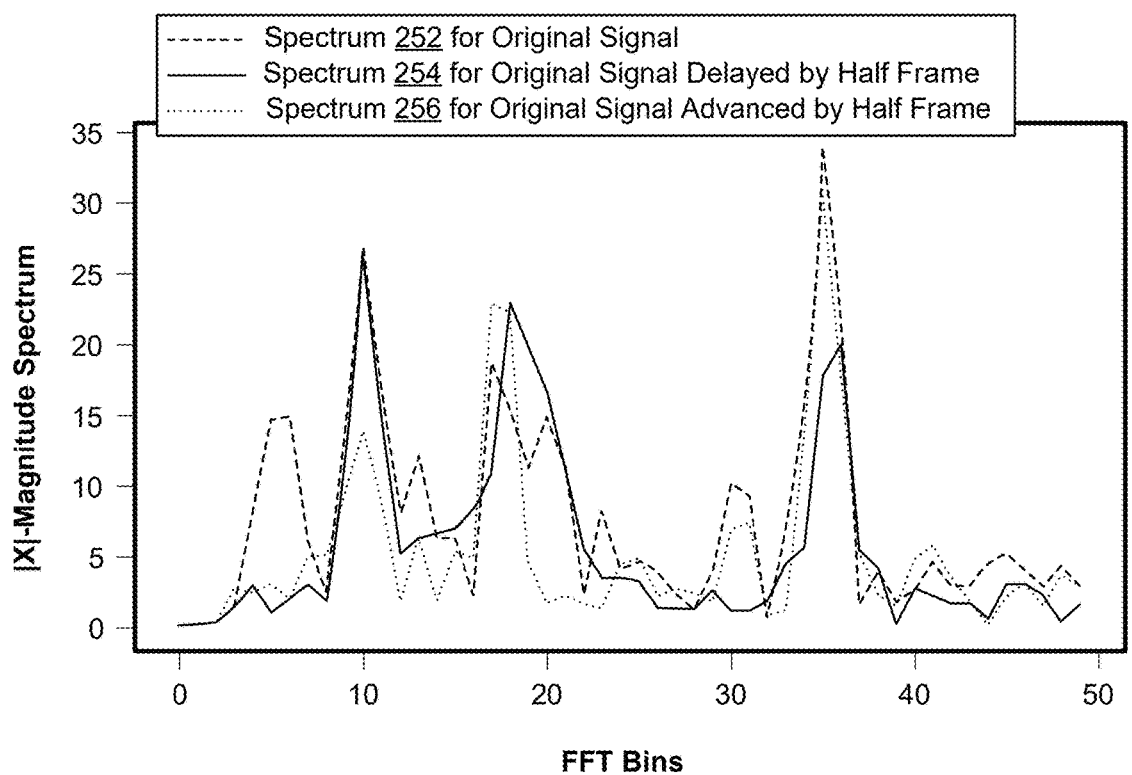
FIG. 2B shows an exemplary magnitude spectrum of audio signals generated based on the audio signal of FIG. 2A, in accordance with one or more example embodiments of the present disclosure.

In one or more embodiments, to generate audio fingerprints from the audio signal 200, a short-time Fourier transform may be determined for the win_len and local peaks in the magnitude spectrum of the audio signal 200, and used as landmarks for the fingerprints. The selected landmarks may be paired to form a fingerprint, such as peak1, peak2, and td as a fingerprint. The fingerprint may be hashed and stored for future matching with query signals. However, there may be an offset issue in the sampling grid used to divide the audio signal 200 into the frames 202. For example, when the audio signal 200 is offset by a half frame, the local peaks in the spectrum may change, as shown in FIG. 2B, for example. Because of the changes in the peaks in the spectrum, the fingerprint for the same audio signal 200 may change, thereby affecting whether a fingerprint generated from the audio signal 200 is determined to correctly match a fingerprint from the same audio content (e.g., a song or other audio track).

FIG. 2B illustrates an exemplary magnitude spectrum 250 of audio signals generated based on the audio signal 200 of FIG. 2A, in accordance with one or more example embodiments of the present disclosure.

Referring to FIG. 2B, a spectrum 252 may represent the magnitude spectrum of the audio signal 200 of FIG. 2A (e.g., the original audio signal), a spectrum 254 may represent the magnitude spectrum of the audio signal 200 delayed by a half frame, and a spectrum 256 may represent the magnitude spectrum of the audio signal 200 advanced by a half frame. As explained above, the audio signal 200 may be offset, causing the peaks in the corresponding spectrum to be different than the peaks of the original audio signal 200 as shown in FIG. 2B. Because the peaks of the spectrum for the original audio signal 200 (e.g., the un-shifted audio signal) may differ from the peaks of the shifted versions of the audio signal 200, the fingerprints generated for the respective signals may differ, affecting the matching analysis that compares fingerprints to identify matching fingerprints.

The offset issue may be present in multiple scenarios. For example, for two signals X and Y that are the same except for a half frame worth of silence at the beginning of signal Y, the spectrums for the two signals may be different, and therefore their fingerprints may be different. In this manner, when comparing signal X to signal Y, a computer system (e.g., the remote device 106 of FIG. 1) may determine that signal X and signal Y do not match even though the signals fundamentally are the same. This problem is especially likely when the query signal is short in time (e.g., five seconds of a song). The problem is also likely when a query signal starts in the middle of the sampling grid (e.g., time=15 in FIG. 2A). As a result, matching rates and matching accuracy of signals may be decreased. Some existing techniques generate many fingerprints to overcome the offset problem under the premise that a significant percentage of fingerprints will overcome the problem when using random sampling. However, generating such a large corpus of fingerprints may cause fingerprint collision and therefore more mismatches (e.g., improperly identified matches) of fingerprints.

Figure 3A:
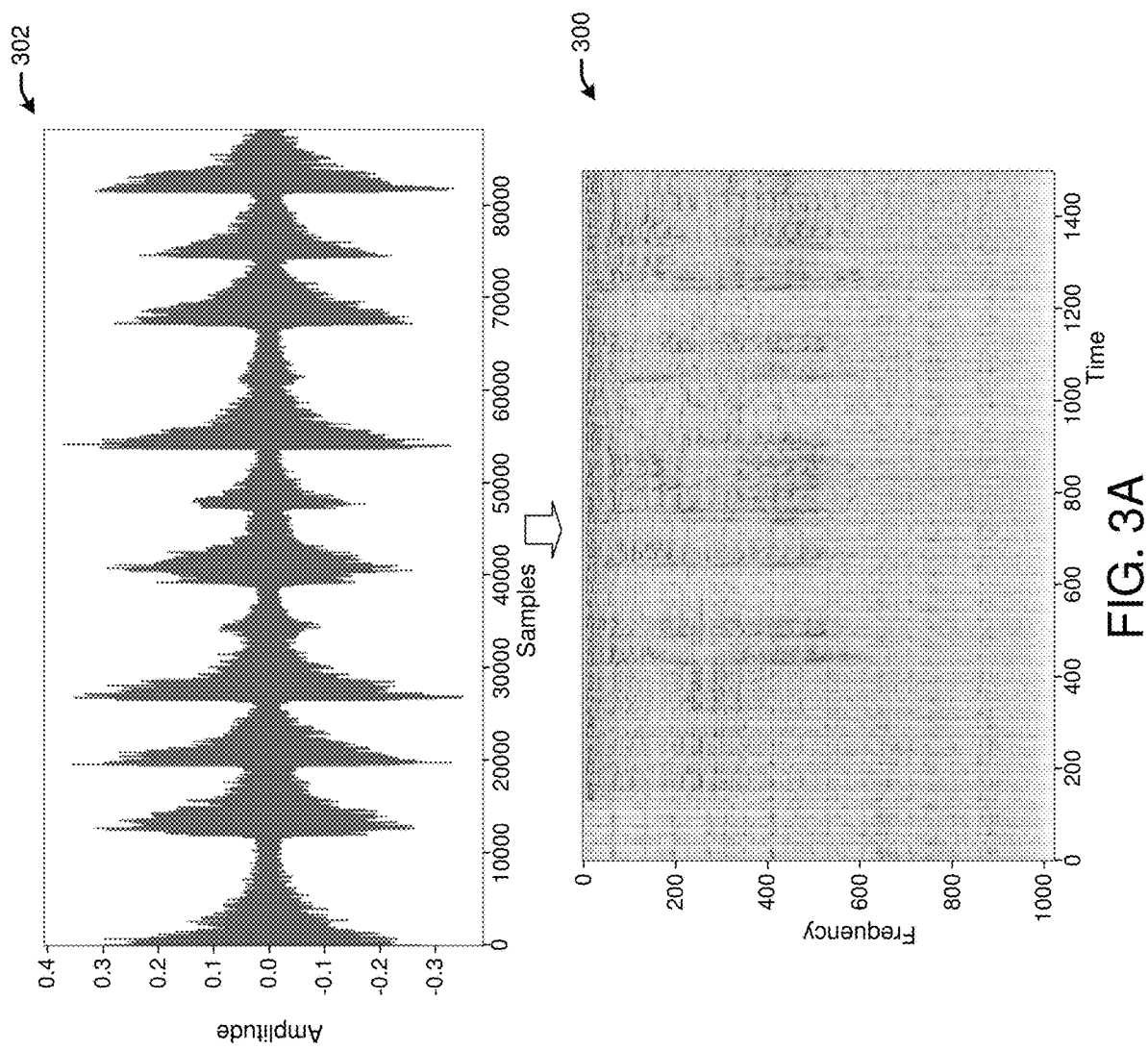
FIG. 3A shows an example spectrogram of a left-shifted signal used to generate an averaged spectrogram for enhanced content matching using content fingerprints, in accordance with one or more example embodiments of the present disclosure.

FIG. 3A shows an example spectrogram 300 of a left-shifted signal 302 used to generate an averaged spectrogram for enhanced content matching using content fingerprints, in accordance with one or more example embodiments of the present disclosure.

Figure 3B:
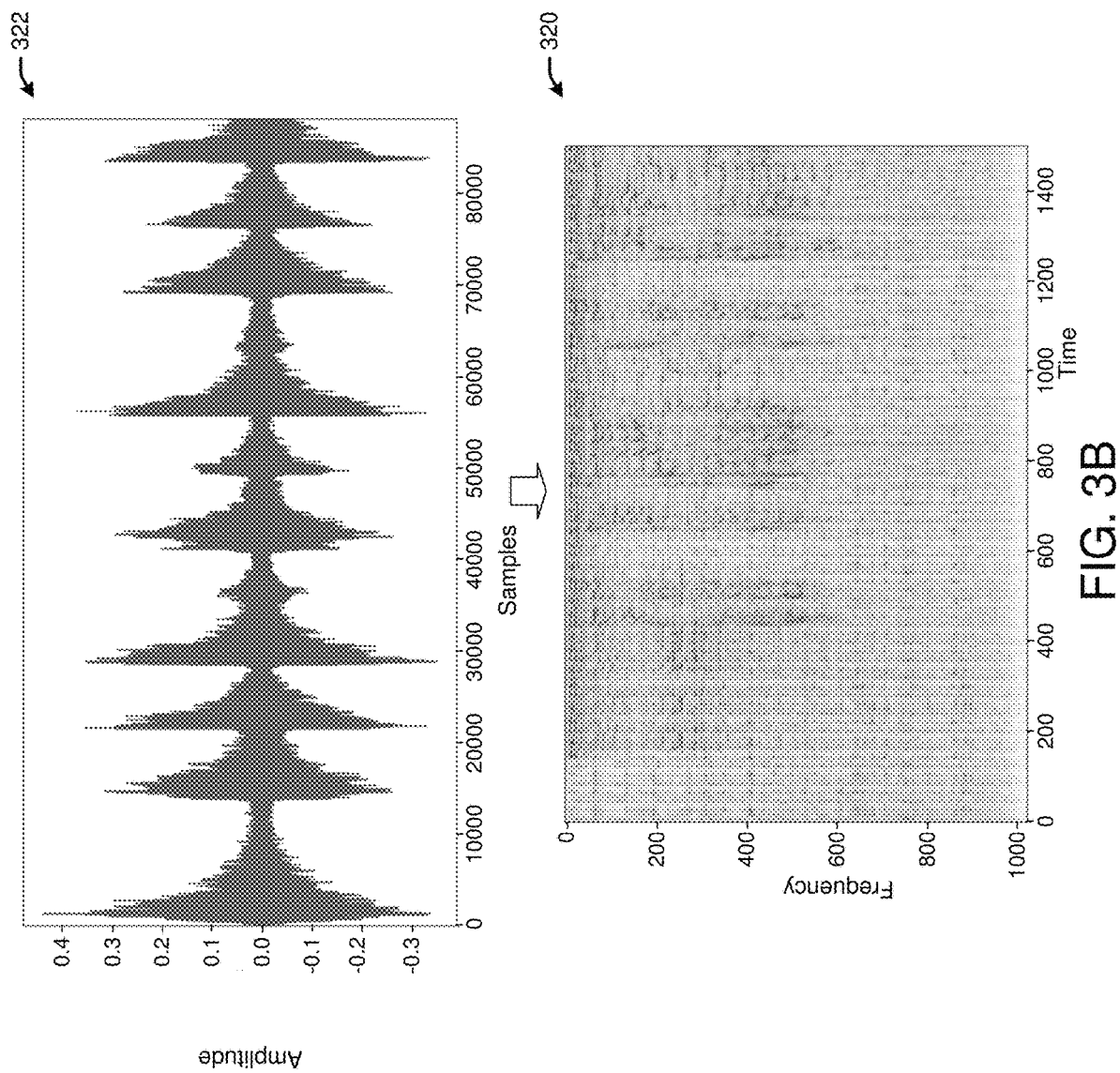
FIG. 3B shows an example spectrogram of an un-shifted original signal used to generate an averaged spectrogram for enhanced content matching using content fingerprints, in accordance with one or more example embodiments of the present disclosure.

FIG. 3B shows an example spectrogram 320 of an un-shifted original signal 322 used to generate an averaged spectrogram for enhanced content matching using content fingerprints, in accordance with one or more example embodiments of the present disclosure.

Figure 3C:
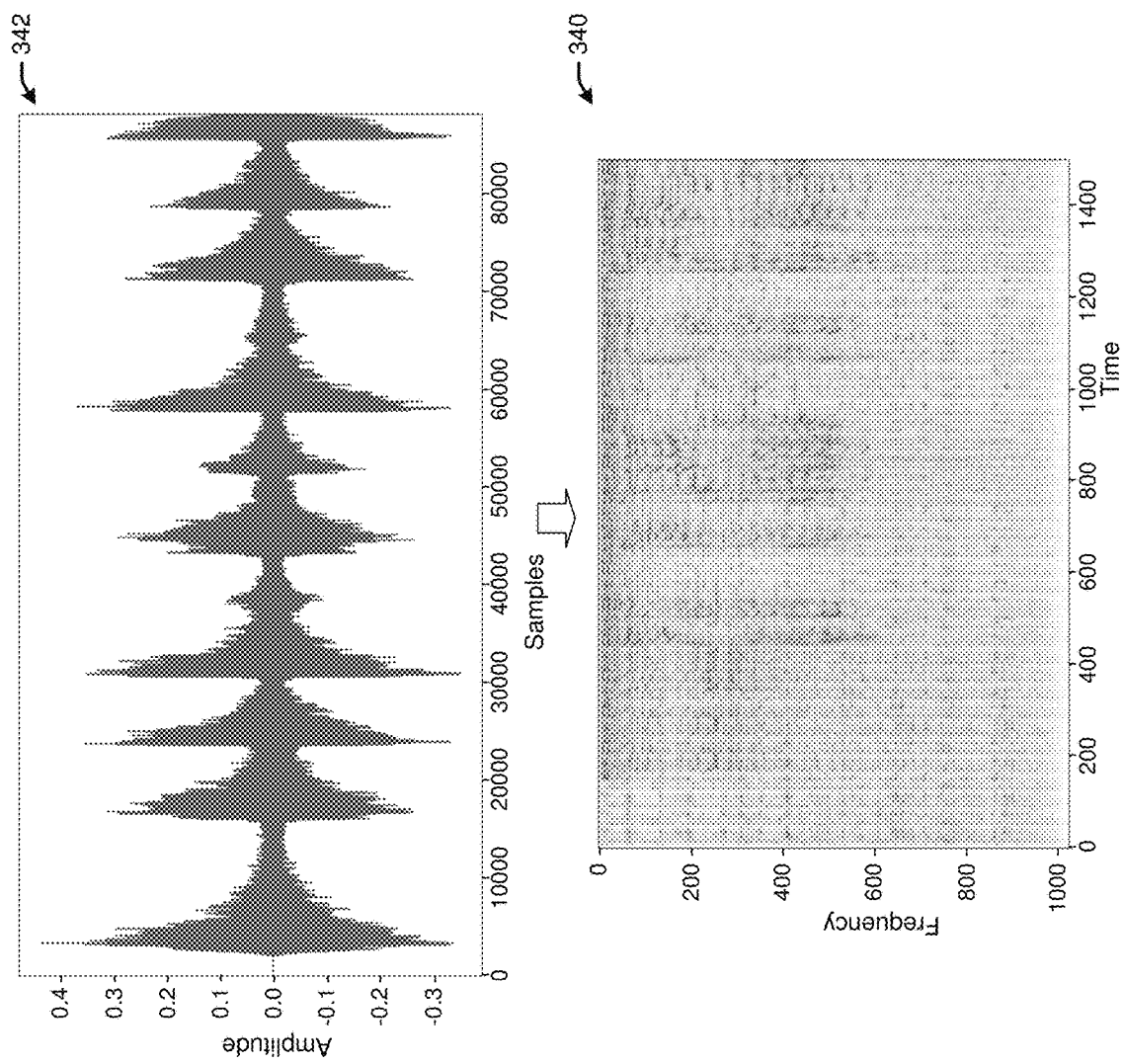
FIG. 3C shows an example spectrogram of a right-shifted signal used to generate an averaged spectrogram for enhanced content matching using content fingerprints, in accordance with one or more example embodiments of the present disclosure.

FIG. 3C shows an example spectrogram 340 of a right-shifted signal 342 used to generate an averaged spectrogram for enhanced content matching using content fingerprints, in accordance with one or more example embodiments of the present disclosure.

Referring to FIGS. 3A-3C, the un-shifted original signal 322 may represent an original audio signal (e.g., the audio signal 200 of FIG. 2A). The left-shifted signal 302 may represent a left-shifted version of the un-shifted original signal 322 (e.g., delayed by a half frame or some other amount). The right-shifted signal 342 may represent a right-shifted version of the un-shifted signal 322 (e.g., advanced by a half frame or some other amount). Using the spectrogram 300, the spectrogram 320, and the spectrogram 340, a computer system (e.g., the remote device 106 of FIG. 1) may generate an averaged spectrogram as shown in FIG. 3D, which may be used to generate fingerprints as explained further herein.

Figure 3D:
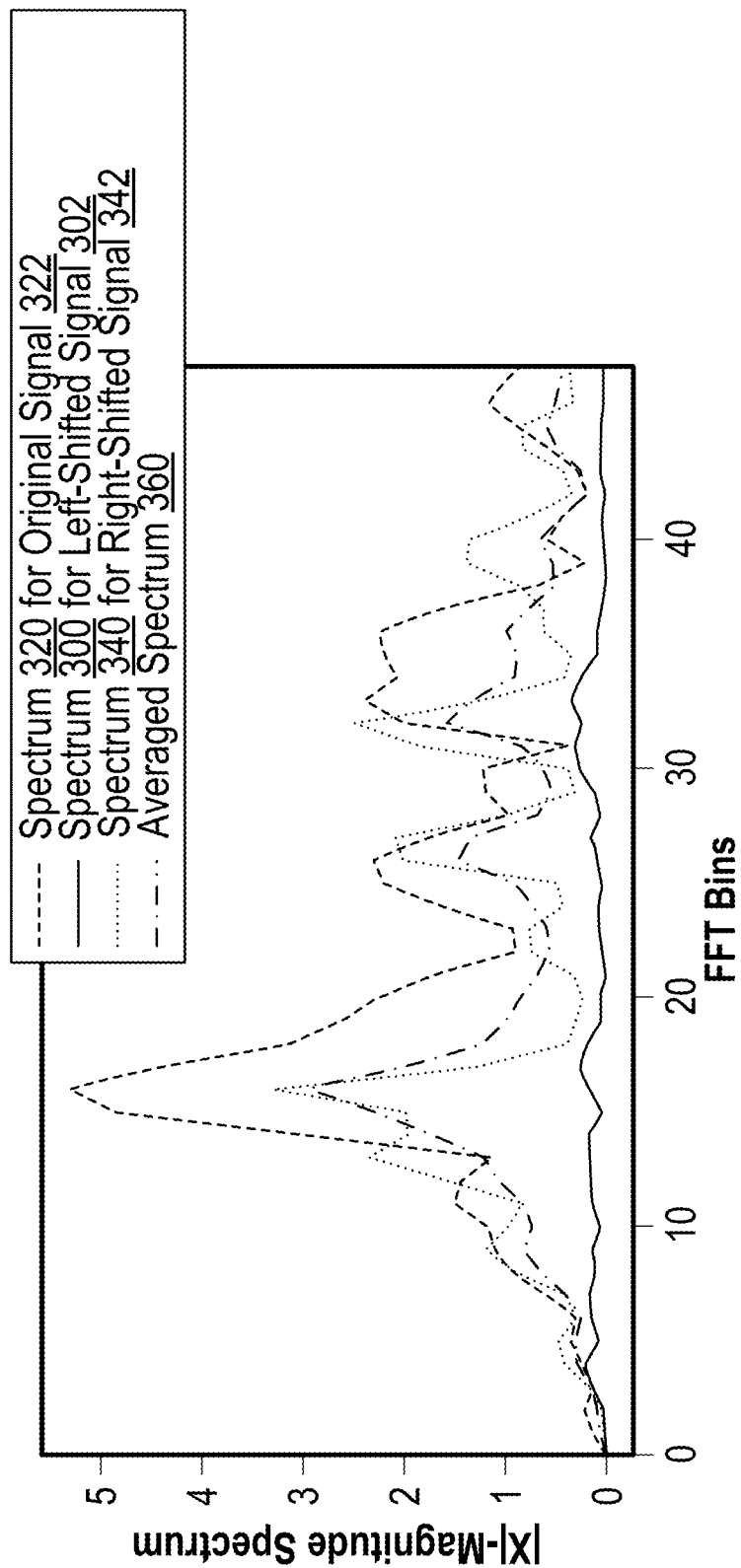
FIG. 3D shows an example averaged spectrogram based on the spectrograms of FIGS. 3A-3C for enhanced content matching using content fingerprints, in accordance with one or more example embodiments of the present disclosure.

FIG. 3D shows an example averaged magnitude spectrum 360 based on the spectrograms of FIGS. 3A-3C for enhanced content matching using content fingerprints, in accordance with one or more example embodiments of the present disclosure.

Referring to FIG. 3D, the averaged magnitude spectrum 360 may be generated (e.g., by the remote device 106 of FIG. 1) using the Equation: $X_{avg}[i,j]=X[i,j]+X_{left}[i,j]+X_{right}[i,j]$, where i is the frame number, j is the bin number, $X_{avg}[i,j]$ the averaged magnitude spectrum 360, $X[i,j]$ is the spectrogram 320, $X_{left}[i,j]$ is the spectrogram 300, and $X_{right}[i,j]$ is the spectrogram 340. In this manner, a computer system (e.g., the remote device 106 of FIG. 1) may generate the averaged magnitude spectrum 360 from the averaged spectrograms of multiple signals. As a result, the peaks of the averaged spectrum 360 are more robust and may result in a more accurate positive matching rate of signals compared to existing techniques that do not use the averaged magnitude spectrum 360.

Referring to FIGS. 3A-3D, while the shifts to the original signal 322 are shown as one shift in each direction (e.g., FIG. 3A and FIG. 3C), the original signal 322 may be shifted multiple times in one or both directions, by a same or differing amounts in time. For any shifted version of the original signal 322, a corresponding spectrogram may be generated (e.g., as shown in FIGS. 3A-3C), and the averaged magnitude spectrum 360 may be generated using the $X_{avg}[i,j]$ by adding the respective spectrograms of the shifted signals to the sum. In this manner, the averaged magnitude spectrum 360 may not be based on only three signals, may not be limited to signals shifted in a particular direction or combination of directions, and may not be limited to shifts of a particular amount in time.

Figure 4:
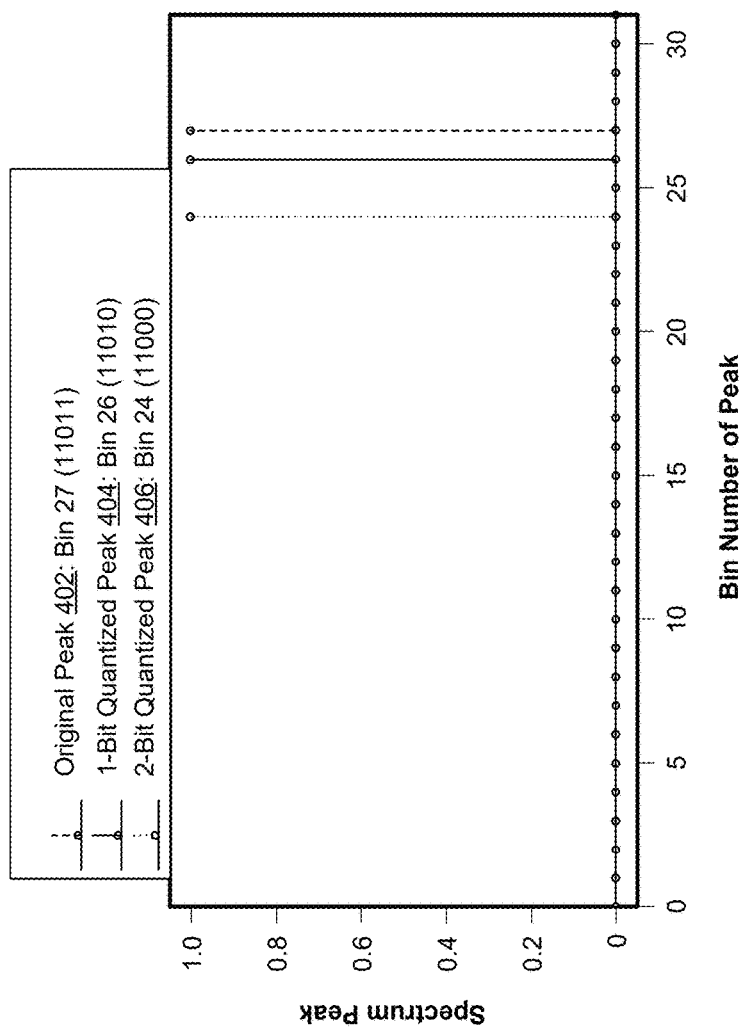
FIG. 4 shows example un-quantized and quantized peaks for enhanced content matching using content fingerprints, in accordance with one or more example embodiments of the present disclosure.

FIG. 4 shows example un-quantized and quantized peaks 400 for enhanced content matching using content fingerprints, in accordance with one or more example embodiments of the present disclosure.

Referring to FIG. 4, an original peak 402, a one-bit quantized version 404 of the original peak 402, and a two-bit quantized version 406 of the original peak 402 are shown. For example, the original peak 402 may be a peak identified from any of the spectrums of FIG. 3D, and is shown as occurring at bin number 27 (represented by binary 11011). A computer system (e.g., the remote device 106 of FIG. 1) may improve fingerprint matching by quantizing one or more bits used to represent the peaks of a signal's spectrogram (e.g., the peaks being used to generate the fingerprints). In particular, using a one-bit quantization, the binary 11011 used to represent the bin of the original peak 402 may result in a binary 11010 (e.g., dropping the least significant bit of 1 from binary 11011, making the bit a 0). Binary 11010 generated using one-bit quantization corresponds to bin 26, which is where the one-bit quantized version 404 of the original peak 402 is shown. Similarly, using two-bit quantization, the binary 11011 used to represent the bin of the original peak 402 may result in a binary 11000 because the two least significant bits of 11011 are dropped (e.g., replaced with zero value). Binary 11000 corresponds to bin 24, which is where the two-bit quantized version 406 of the original peak 402 is shown. The quantization (e.g., dropping of least significant bits) of peaks may improve the robustness of generated fingerprints.

In one or more embodiments, quantization of peaks may occur together or independently. For example, for a peak with a bin of 123, a one-bit quantization of bin 123 results in bin 122. For a peak with a bin of 47, a one-bit quantization of bin 47 results in bin 46. A fingerprint may be generated with peaks at bin 123 and bin 47, and the time difference td between when the peaks occurred.

In one or more embodiments, hashing the quantized peaks may be more robust than hashing the peaks themselves. The time difference td may be hashed, but does not need to be. A computer system (e.g., the remote device 106 of FIG. 1) may generate a hash using 8 bits for the first peak, 7 bits for the second peak, and 5 bits for td. Using the example above of a fingerprint with peaks at bin 123 and bin 47, a version of the hash for the un-quantized values may be 123<<12+47<<5+td=505322, and a version of the hash for the quantized values may be 122<<12+46<<5+td=501194. As a result, one- and two-bit quantization of the peaks may result in more fingerprint hashes being identified in the matching process.

Figure 5:
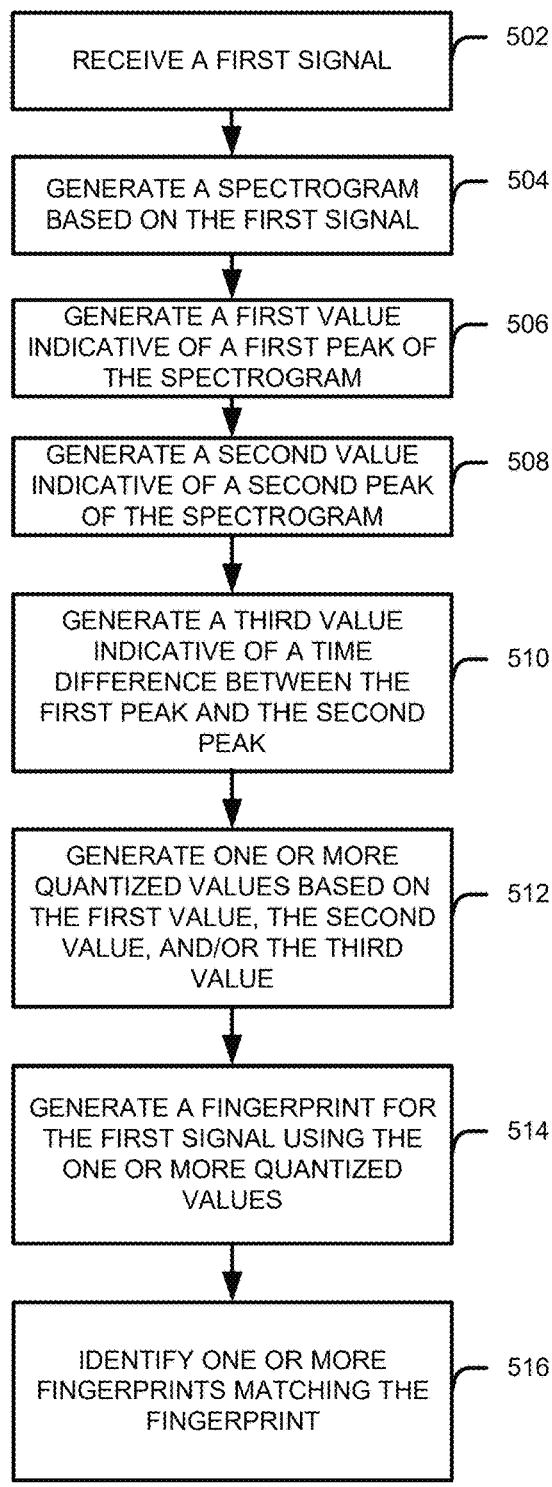
FIG. 5 illustrates a flow diagram for a process for enhanced content matching using content fingerprints, in accordance with one or more example embodiments of the present disclosure.

FIG. 5 illustrates a flow diagram for a process 500 for enhanced content matching using content fingerprints, in accordance with one or more example embodiments of the present disclosure.

At block 502, a device (e.g., the remote device 106 of FIG. 1) may receive a first signal (e.g., the audio clip 104 of FIG. 1). The first signal may represent a portion of audio content, such as a song, a device signal, a biometric signal, or the like. The first signal may be received as a query, and may represent a query signal to be compared to a corpus of other signals to identify a matching signal (e.g., using signal fingerprints).

At block 504, the device may generate a spectrogram based on the first signal (e.g., as shown in FIGS. 3A-3C). The spectrogram may show the magnitude of the first signal over time at various frequencies present in the signal's waveform.

At block 506, the device may generate a first value indicative of a first peak of the spectrogram. At block 508, the device may generate a second value indicative of a second peak of the spectrogram. The device may identify peaks in the spectrogram, and the bins at which the peaks are identified. The bin number may be used to represent the peak. For example, referring to FIG. 4, a peak may be identified at bin 27, so the value for the peak may be 27.

At block 510, the device may generate a third value (e.g., td) indicative of a time difference between the first and second peaks. For example, when the time between the first and second peaks is ten milliseconds, then the time difference td may be ten.

At block 512, the device may generate one or more quantized values based on the first, second, and/or third values. In particular, the device may quantize the first and/or second values for the peaks, and optionally the third value for td, by one or two bits each, or may quantize each value independently. The quantization at block 512 may represent a dropping of least significant bits to improve robustness of generated fingerprints. Any one or multiple of the first, second, and third values may be quantized.

At block 514, the device may generate a fingerprint for the first signal using the one or more quantized values. For example, the fingerprint may be created using (first value, second value, third value), any of which may be quantized as described at block 512. The fingerprint may be represented by: first value bitOR second value bitOR third value, any value of which may be quantized. The device may shift the first value (e.g., by 9+6=15 bits), may shift the second value (e.g., by 6 bits), and leave the third value un-shifted. In this manner, the fingerprint may be generated using bitOR (e.g., bitwise OR operation) to generate a fingerprint (e.g., of 24 bits).

At block 516, the device may identify one or more matching fingerprints for the fingerprint generated at block 514 (e.g., step 130 of FIG. 1). The matching fingerprint(s) may have the same first, second, and third values, or values within threshold amounts from the first, second, and third values of the fingerprint generated at block 514. In this manner, the matching fingerprints may represent a same source (e.g., a same song), or may represent a same or similar profile (e.g., biometric profile, device profile, etc.) depending on the source of the first signal.

Figure 6:
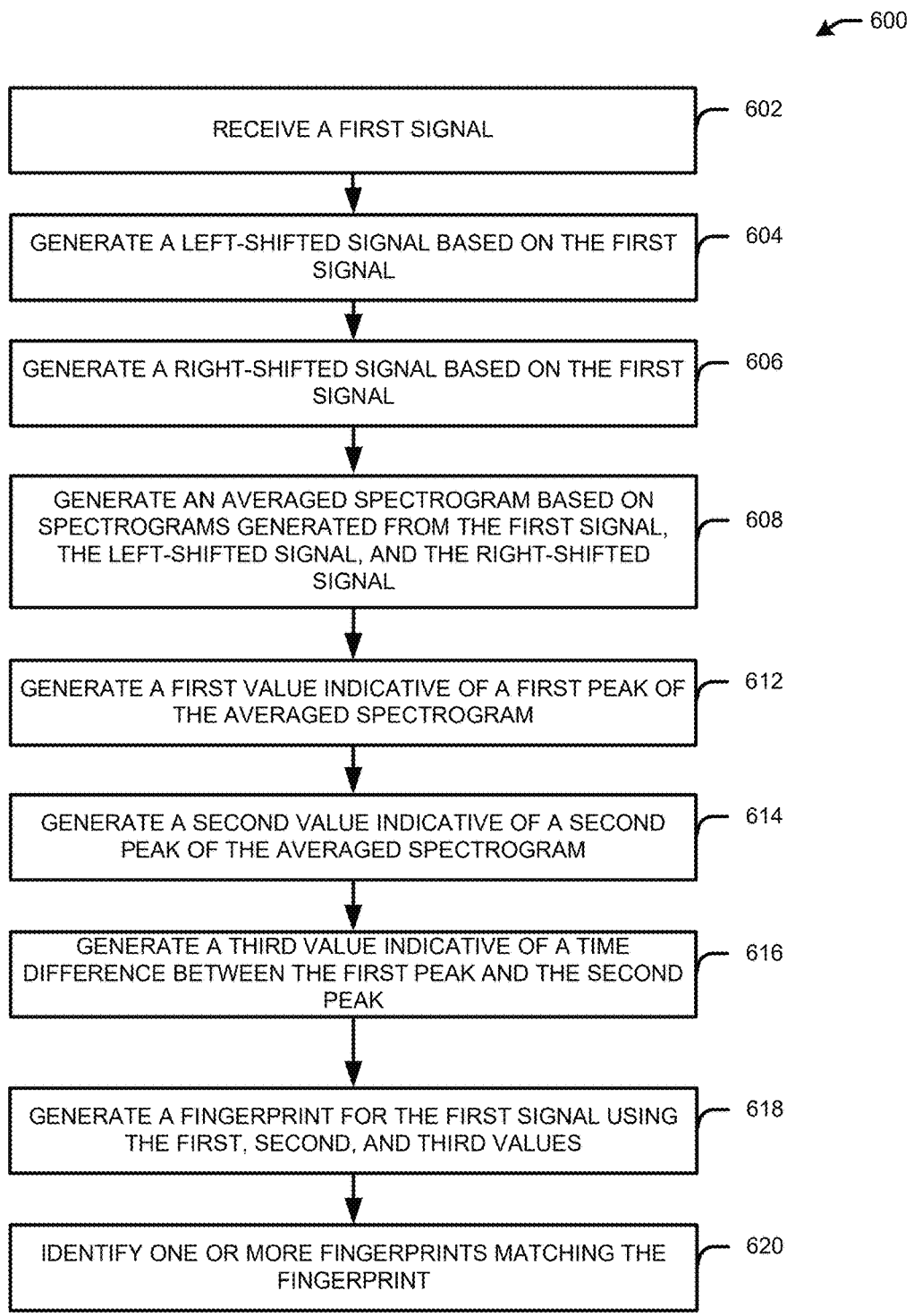
FIG. 6 illustrates a flow diagram for a process for enhanced content matching using content fingerprints, in accordance with one or more example embodiments of the present disclosure.

FIG. 6 illustrates a flow diagram for a process 600 for enhanced content matching using content fingerprints, in accordance with one or more example embodiments of the present disclosure.

At block 602, a device (e.g., the remote device 106 of FIG. 1) may receive a first signal (e.g., the audio clip 104 of FIG. 1). The first signal may represent a portion of audio content, such as a song, a device signal, a biometric signal, or the like. The first signal may be received as a query, and may represent a query signal to be compared to a corpus of other signals to identify a matching signal (e.g., using signal fingerprints). The first signal may be an original, un-shifted signal (e.g., FIG. 3B).

At block 604, the device may generate a left-shifted signal based on the first signal (e.g., a left-shifted version of the first signal, as shown in FIG. 3A). For example, the device may delay the first signal by an amount of frames (e.g., a half frame or some other number). At block 606, the device may generate a right-shifted signal based on the first signal (e.g., a right-shifted version of the first signal, as shown in FIG. 3C). For example, the device may advance the first signal by an amount of time. In this manner, the device may have three different signals based on the original signal.

At block 608, the device may generate an averaged spectrogram (e.g., the averaged magnitude spectrum 360 of FIG. 3D) based on the first signal, the left-shifted signal, and the right-shifted signal. In particular, the device may generate respective spectrograms from each of the first signal, the left-shifted signal, and the right-shifted signal (e.g., FIGS. 3A-3C), and based on any additional shifted signals generated from the first signal. For example, the device may use the Equation: $X_{avg}[i,j]=X[i,j]+X_{left}[i,j]+X_{right}[i,j]$, where i is the frame number, j is the bin number, $X_{avg}[i,j]$ is an averaged spectrogram, $X[i,j]$ is the first spectrogram, $X_{left}[i,j]$ is the left-shifted spectrogram, and $X_{right}[i,j]$ is the right-shifted spectrogram. The first signal may be shifted multiple times in one or both directions, by a same or differing amounts in time. For any shifted version of the first signal, a corresponding spectrogram may be generated (e.g., as shown in FIGS. 3A-3C), and the averaged spectrogram may be generated using the $X_{avg}[i,j]$ by adding the respective spectrograms of the shifted signals to the sum. In this manner, the averaged spectrogram may not be based on only three signals, may not be limited to signals shifted in a particular direction or combination of directions, and may not be limited to shifts of a particular amount in time.

At block 612, the device may generate a first value indicative of a first peak of the averaged spectrogram. At block 614, the device may generate a second value indicative of a second peak of the averaged spectrogram. The device may identify peaks in the averaged spectrogram, and the bins at which the peaks are identified. The bin number may be used to represent the peak. For example, referring to FIG. 4, a peak may be identified at bin 27, so the value for the peak may be 27.

At block 616, the device may generate a third value (e.g., td) indicative of a time difference between the first and second peaks. For example, when the time between the first and second peaks is five milliseconds, then the time difference td may be five.

At block 618, the device may generate a fingerprint for the first signal using the first, second, and third values. For example, the fingerprint may be created using (first value, second value, third value), any of which may be quantized as described at block 512 of FIG. 5. The fingerprint may be represented by: first value bitOR second value bitOR third value, any value of which may be quantized. The device may shift the first value (e.g., by 9+6=15 bits), may shift the second value (e.g., by 6 bits), and leave the third value un-shifted. In this manner, the fingerprint may be generated using bitOR (e.g., bitwise OR operation) to generate a fingerprint (e.g., of 24 bits).

At block 620, the device may identify one or more matching fingerprints for the fingerprint generated at block 618 (e.g., step 130 of FIG. 1). The matching fingerprint(s) may have the same first, second, and third values, or values within threshold amounts from the first, second, and third values of the fingerprint generated at block 618. In this manner, the matching fingerprints may represent a same source (e.g., a same song), or may represent a same or similar profile (e.g., biometric profile, device profile, etc.) depending on the source of the first signal.

Figure 7:
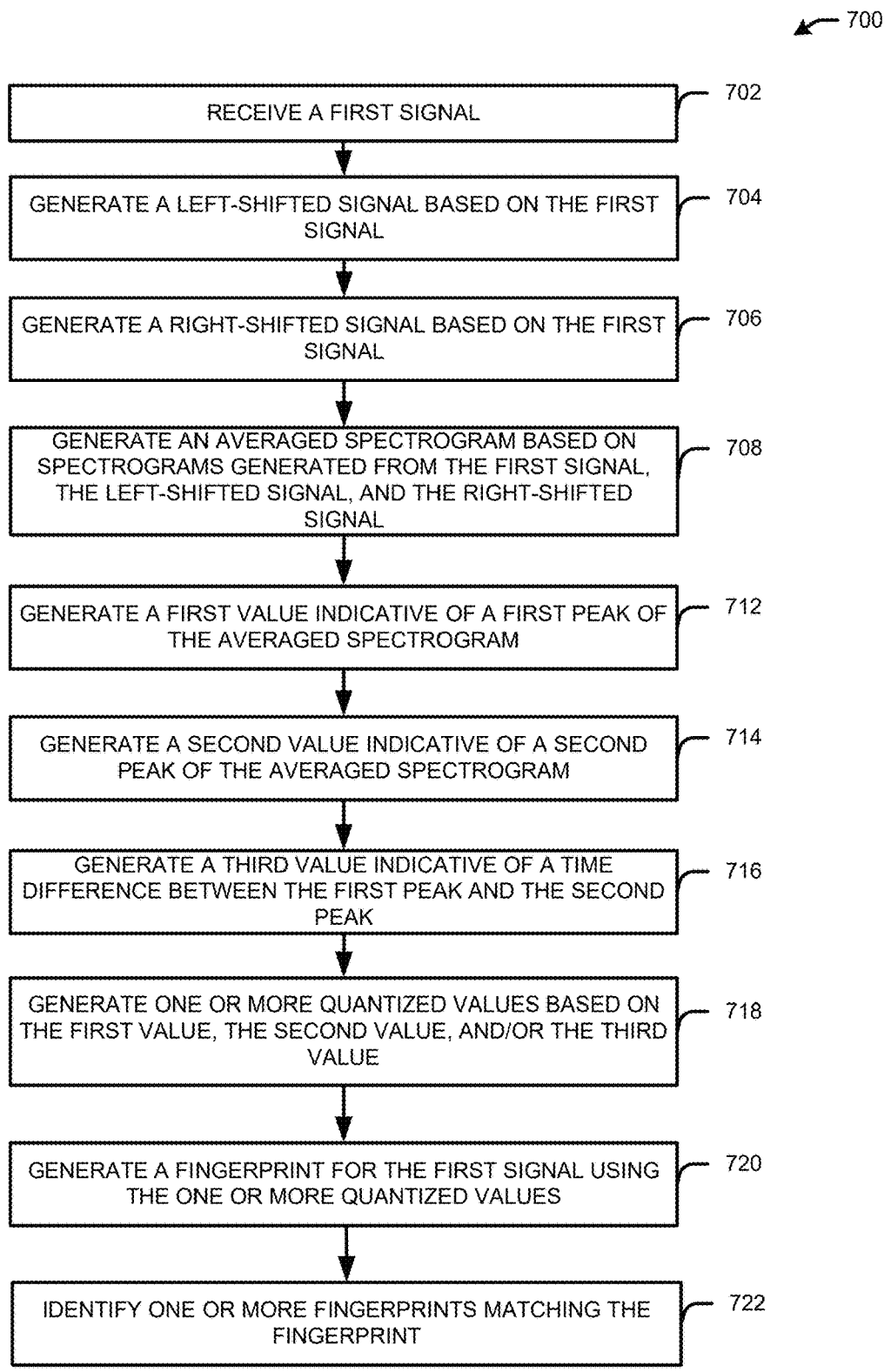
FIG. 7 illustrates a flow diagram for a process for enhanced content matching using content fingerprints, in accordance with one or more example embodiments of the present disclosure.

FIG. 7 illustrates a flow diagram for a process 700 for enhanced content matching using content fingerprints, in accordance with one or more example embodiments of the present disclosure.

At block 702, a device (e.g., the remote device 106 of FIG. 1) may receive a first signal (e.g., the audio clip 104 of FIG. 1). The first signal may represent a portion of audio content, such as a song, a device signal, a biometric signal, or the like. The first signal may be received as a query, and may represent a query signal to be compared to a corpus of other signals to identify a matching signal (e.g., using signal fingerprints). The first signal may be an original, un-shifted signal (e.g., FIG. 3B).

At block 704, the device may generate a left-shifted signal based on the first signal (e.g., a left-shifted version of the first signal, as shown in FIG. 3A). For example, the device may delay the first signal by an amount of frames (e.g., a half frame or some other number). At block 706, the device may generate a right-shifted signal based on the first signal (e.g., a right-shifted version of the first signal, as shown in FIG. 3C). For example, the device may advance the first signal by an amount of frames (e.g., a half frame or some other number). In this manner, the device may have three different signals based on the original signal.

At block 708, the device may determine an averaged spectrogram (e.g., the averaged magnitude spectrum 360 of FIG. 3D) based on the first signal, the left-shifted signal, and the right-shifted signal. In particular, the device may generate respective spectrograms from each of the first signal, the left-shifted signal, and the right-shifted signal (e.g., FIGS. 3A-3C), and based on any additional shifted signals generated from the first signal. For example, the device may use the Equation: $X_{avg}[i,j]=X[i,j]+X_{left}[i,j]+X_{right}[i,j]$, where i is the frame number, j is the bin number, $X_{avg}[i,j]$ is an averaged spectrogram, $X[i,j]$ is the first spectrogram, $X_{left}[i,j]$ is the left-shifted spectrogram, and $X_{right}[i,j]$ is the right-shifted spectrogram. The first signal may be shifted multiple times in one or both directions, by a same or differing amounts in time. For any shifted version of the first signal, a corresponding spectrogram may be generated (e.g., as shown in FIGS. 3A-3C), and the averaged spectrogram may be generated using the $X_{avg}[i,j]$ by adding the respective spectrograms of the shifted signals to the sum. In this manner, the averaged spectrogram may not be based on only three signals, may not be limited to signals shifted in a particular direction or combination of directions, and may not be limited to shifts of a particular amount in time.

At block 712, the device may generate a first value indicative of a first peak of the averaged spectrogram. At block 714, the device may generate a second value indicative of a second peak of the averaged spectrogram. The device may identify peaks in the averaged spectrogram, and the bins at which the peaks are identified. The bin number may be used to represent the peak. For example, referring to FIG. 4, a peak may be identified at bin 27, so the value for the peak may be 27.

At block 716, the device may generate a third value (e.g., td) indicative of a time difference between the first and second peaks. For example, when the time between the first and second peaks is five milliseconds, then the time difference td may be five.

At block 718, the device may generate one or more quantized values based on the first, second, and/or third values. In particular, the device may quantize the first and second values for the peaks, and optionally the third value for td, by one or two bits each, or may quantize each value independently. The quantization at block 718 may represent a dropping of least significant bits to improve robustness of generated fingerprints. Any one or multiple of the first, second, and third values may be quantized.

At block 720, the device may generate a fingerprint for the first signal using the one or more quantized values. For example, the fingerprint may be created using (first value, second value, third value), any of which may be quantized as described at block 718. The fingerprint may be represented by: first value bitOR second value bitOR third value, any value of which may be quantized. The device may shift the first value (e.g., by 9+6=15 bits), may shift the second value (e.g., by 6 bits), and leave the third value un-shifted. In this manner, the fingerprint may be generated using bitOR (e.g., bitwise OR operation) to generate a fingerprint (e.g., of 24 bits).

At block 722, the device may identify one or more matching fingerprints for the fingerprint generated at block 514 (e.g., step 130 of FIG. 1). The matching fingerprint(s) may have the same first, second, and third values, or values within threshold amounts from the first, second, and third values of the fingerprint generated at block 720. In this manner, the matching fingerprints may represent a same source (e.g., a same song), or may represent a same or similar profile (e.g., biometric profile, device profile, etc.) depending on the source of the first signal.

The examples presented herein are not intended to be limiting.

Figure 8:
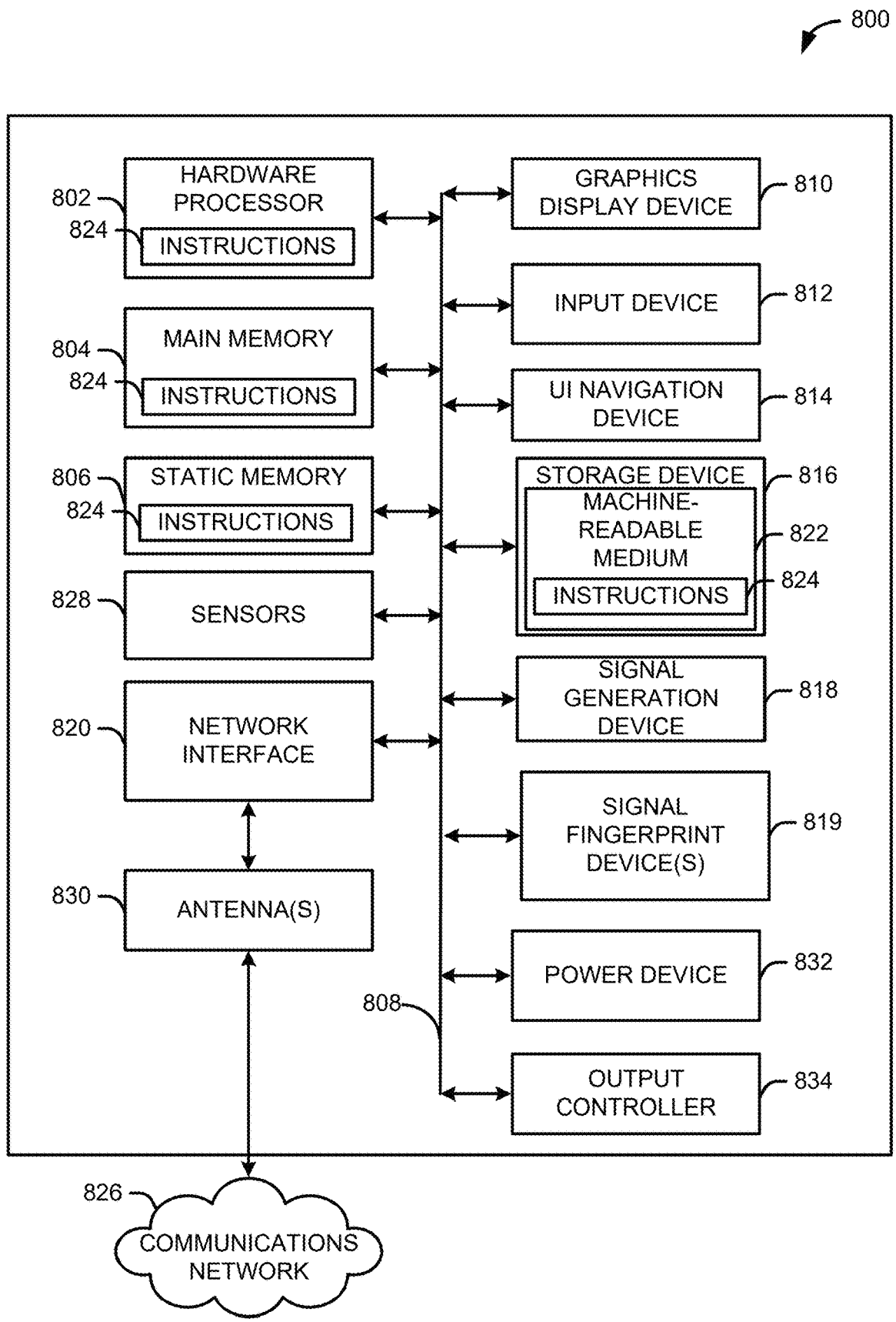
FIG. 8 illustrates a block diagram of an example machine upon which any of one or more techniques (e.g., methods) may be performed, in accordance with one or more example embodiments of the present disclosure.

FIG. 8 illustrates a block diagram of an example of a machine 800 (e.g., the device 102 of FIG. 1, the remote device 106 of FIG. 1) or system upon which any one or more of the techniques (e.g., methodologies) discussed herein may be performed. In other embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in Wi-Fi direct, peer-to-peer (P2P) (or other distributed) network environments. The machine 800 may be a server, a media device, a remote control device, a streaming media device, a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware)

capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a power management device 832, a graphics display device 810, an alphanumeric input device 812 (e.g., a keyboard), and a user interface (UI) navigation device 814 (e.g., a mouse). In an example, the graphics display device 810, alphanumeric input device 812, and UI navigation device 814 may be a touch screen display. The machine 800 may additionally include a storage device (i.e., drive unit) 816, a signal generation device 818 (e.g., a speaker, emitters, etc.), one or more signal fingerprint devices 819 (e.g., capable of performing the steps of the remote device 106 of FIG. 1, sampling a signal as in FIG. 2A, generating spectrums as in FIG. 2B-3D, determining spectrum peaks as in FIG. 4, and performing the processes of FIGS. 5-7), a network interface device/transceiver 820 coupled to antenna(s) 830, and one or more sensors 828, such as camera sensors or other sensors. The machine 800 may include an output controller 834, such as a serial (e.g., universal serial bus (USB), parallel, or other wired or wireless (e.g., infrared (IR), near field communication (NFC), etc.) connection to communicate with or control one or more peripheral devices (e.g., a media device, etc.)).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, or within the hardware processor 802 during execution thereof by the machine 800. In an example, one or any combination of the hardware processor 802, the main memory 804, the static memory 806, or the storage device 816 may constitute machine-readable media.

While the machine-readable medium 822 is illustrated as a single medium, the term "machine-readable medium" may include a single medium or multiple media (e.g., a centralized or distributed database, and/or associated caches and servers) configured to store the one or more instructions 824.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 800 and that cause the machine 800 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device/transceiver 820 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 820 may include one or more physical jacks (e.g., Ethernet, coaxial, or phone jacks) or one or more antennas to connect to the communications network 826. In an example, the network interface device/transceiver 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 800 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method, comprising:
    receiving, by at least one processor of a device, a first audio signal comprising a portion of a song;
    generating, by the at least one processor, a second audio signal based on shifting the first audio signal by a first amount of time in a first direction;
    generating, by the at least one processor, a third audio signal based on shifting the first audio signal by a second amount of time in a second direction;
    generating, by the at least one processor, a first spectrogram based on the first audio signal;
    generating, by the at least one processor, a second spectrogram based on the second audio signal;
    generating, by the at least one processor, a third spectrogram based on the third audio signal;
    generating, by the at least one processor, an averaged spectrogram based on an average of the first spectrogram, the second spectrogram, and the third spectrogram;
    identifying, by the at least one processor, a first peak of the averaged spectrogram, the first peak occurring at a first time;
    identifying, by the at least one processor, a second peak of the averaged spectrogram, the second peak occurring at a second time;
    generating, by the at least one processor, a first value indicative of the first peak, the first value consisting of a first number of bits;
    generating, by the at least one processor, a second value indicative of the second peak, the second value consisting of a second number of bits less than the first number of bits;
    generating, by the at least one processor, a third value indicative of a difference between the second time and the first time;
    generating, by the at least one processor, a first quantized value by setting a least significant bit from the first value to zero;

generating, by the at least one processor, a second quantized value by setting a least significant bit from the second value to zero;

generating, by the at least one processor, based on a hash using the first quantized value and the second quantized value, and the hash excluding the third value indicative of the difference between the second time and first time, a first fingerprint of the first quantized value, the second quantized value, and the third value;

determining, by the at least one processor, based on a comparison of the first fingerprint to a second fingerprint generated based on a fourth audio signal, a match between the first fingerprint and the second fingerprint;

determining, by the at least one processor, based on the match, that the first fingerprint and the second fingerprint are based on the song; and sending, by the at least one processor, an indication that the first fingerprint and the second fingerprint are based on the song.

2. The method of claim 1, further comprising:

generating a third quantized value by shifting the first quantized value by a third number of bits; and generating a fourth quantized value by shifting the second quantized value by a fourth number of bits, wherein generating the first fingerprint is further based on the third quantized value and the fourth quantized value.

3. The method of claim 1, wherein generating the first fingerprint is further based on a bitwise OR operation applied to the first quantized value, the second quantized value, and the third value, the bitwise OR operation comprising the first quantized value bitwise OR with the second quantized value bitwise OR with the third value.

4. A method, comprising:

receiving, by at least one processor of a device, a first signal;

generating, by the at least one processor, a second signal by time-shifting the first signal;

generating, by the at least one processor, an averaged spectrogram by averaging a first spectrogram for the first signal and a second spectrogram for the second signal;

generating, by the at least one processor, a first value indicative of a first peak of the averaged spectrogram, the first peak occurring at a first time;

generating, by the at least one processor, a second value indicative of a second peak of the averaged spectrogram, the second peak occurring at a second time;

generating, by the at least one processor, a third value indicative of a difference between the second time and the first time;

generating, by the at least one processor, at least one quantized value by setting at least one bit from at least one of the first value or the second value to zero;

generating, by the at least one processor, based on a hash using the first value, the second value, and the at least one quantized value, and the hash excluding the third value indicative of the difference between the second time and the first time, a first fingerprint of the first value, the second value, and the third value;

determining, by the at least one processor, based on a comparison of the first fingerprint to a second fingerprint generated based on a third signal, a match between the first fingerprint and the second fingerprint; and sending, by the at least one processor, an indication of the match.

5. The method of claim 4, further comprising:

generating a first quantized value of the at least one quantized value by shifting the first value by a first number of bits; and generating a second quantized value of the at least one quantized value by shifting the second value by a second number of bits, wherein generating the first fingerprint is further based on the first quantized value and the second quantized value.

6. The method of claim 4, wherein generating the second signal comprises time-shifting the first signal by a first amount of time in a first direction, the method further comprising:

generating a fourth signal by time-shifting the first signal by a second amount of time in a second direction;

generating the first spectrogram based on the first signal;

generating the second spectrogram based on the second signal; and generating a third spectrogram based on the fourth signal, wherein generating the averaged spectrogram is based on the second spectrogram, the third spectrogram, and the first spectrogram.

7. The method of claim 6, wherein the first amount of time and the second amount of time are equal.

8. The method of claim 6, wherein the first amount of time and the second amount of time are different.

9. The method of claim 6, further comprising:

generating a fifth signal by time-shifting the first signal a third amount of time in the first direction;

generating a fourth spectrogram based on the fifth signal;

generating a sixth signal based on shifting the first signal a fourth amount of time in the second direction; and generating a fifth spectrogram based on the sixth signal, wherein generating the averaged spectrogram is based on the first spectrogram, the second spectrogram, the third spectrogram, the fourth spectrogram, and the fifth spectrogram.

10. The method of claim 4, wherein generating the second signal is based on time-shifting the first signal by a first amount of time in a first direction, the method further comprising:

receiving a fourth signal;

generating a fifth signal by time-shifting the fourth signal by a second amount of time in a second direction;

generating the first spectrogram based on the first signal;

generating the second spectrogram based on the second signal; and generating third spectrogram based on the fourth signal, wherein generating the averaged spectrogram is based on averaging the first spectrogram, the second spectrogram, and the third spectrogram.

11. The method of claim 4, wherein:

generating the at least one quantized value further comprises setting a second bit from the first value to zero to generate a first quantized value, and setting a third bit from the second value to zero to generate a second quantized value, wherein the second bit and the third bit are least significant bits.

12. The method of claim 11, further comprising:

generating a third quantized value by shifting the first quantized value a first amount of time; and generating a fourth quantized value by shifting the second quantized value a second amount of time, wherein generating the first fingerprint is further based on a bitwise OR operation applied to the third quantized value and the fourth quantized value.

13. The method of claim 4, wherein generating the at least one quantized value comprises generating a quantized value based on the third value.

14. The method of claim 4, wherein the second value is a differential with respect to the first value.

15. The method of claim 4, further comprising:
determining a first bin number associated with the first peak; and
determining a second bin number associated with the second peak,
wherein the bit from the first value set to zero is a least significant bit of a first binary number representing the first bin number, and
wherein the bit from the second value set to zero is a least significant bit of a second binary number representing the second bin number.

16. A system comprising at least one processor coupled to memory, the at least one processor configured to:
receive a first signal;
generate a second signal by time-shifting the first signal;
generate an averaged spectrogram by averaging a first spectrogram for the first signal and a second spectrogram for the second signal;
generate a first value indicative of a first peak of the averaged spectrogram, the first peak occurring at a first time;
generate a second value indicative of a second peak of the averaged spectrogram, the second peak occurring at a second time;
generate a third value indicative of a difference between the second time and the first time;
generate at least one quantized value by setting at least one bit from at least one of the first value or the second value to zero;
generate, based on a hash using the first value, the second value, and the at least one quantized value, and the hash excluding the third value indicative of the difference between the second time and the first time, a first fingerprint of the first value, the second value, and the third value;
determine, based on a comparison of the first fingerprint to a second fingerprint generated based on a third signal, a match between the first fingerprint and the second fingerprint; and
send an indication of the match.

17. The system of claim 16, wherein the at least one processor is further configured to:
generate a first quantized value of the at least one quantized value by shifting the first value by a third number of bits; and
generate a second quantized value of the at least one quantized value by shifting the second quantized value by a fourth number of bits,
wherein to generate the first fingerprint is further based on the first quantized value and the second quantized value.

18. The system of claim 16, wherein to generate the second signal comprises time-shifting the first signal by a first amount of time in a first direction, and wherein the at least one processor is further configured to:
generate a fourth signal by time-shifting the first signal by a second amount of time in a second direction;
generate the first spectrogram based on the first signal;
generate the second spectrogram based on the second signal; and
generating a third spectrogram based on the fourth signal,
wherein to generate the averaged spectrogram is based on the second spectrogram, the third spectrogram, and the first spectrogram.

19. The system of claim 16, wherein to generate the second signal is based on time-shifting the first signal by a first amount of time in a first direction, and wherein the at least one processor is further configured to:
receive a fourth signal;
generate a fifth signal by time-shifting the fourth signal by a second amount of time in a second direction;
generate the first spectrogram based on the first signal;
generate the second spectrogram based on the second signal; and
generate a third spectrogram based on the fourth signal,
wherein to generate the averaged spectrogram is based on the second spectrogram, the third spectrogram, and the first spectrogram.

20. The system of claim 16, wherein:
to generate the at least one quantized value further comprises to set a second bit from the first value to zero to generate a first quantized value, and to set a second bit from the second value to zero to generate a second quantized value.

* * * * *